(No Model.)
G. J. HABERMANN.
MEASURING DEVICE FOR LIQUIDS.
No. 599,704.  Patented Mar. 1, 1898.
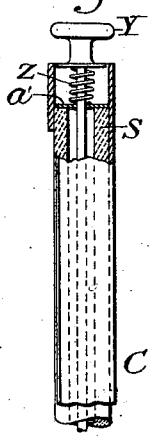
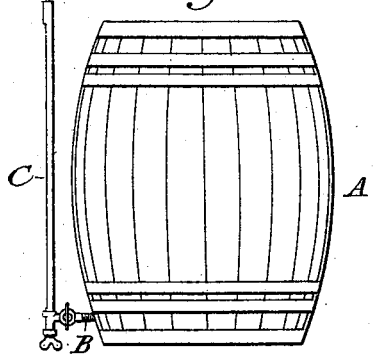
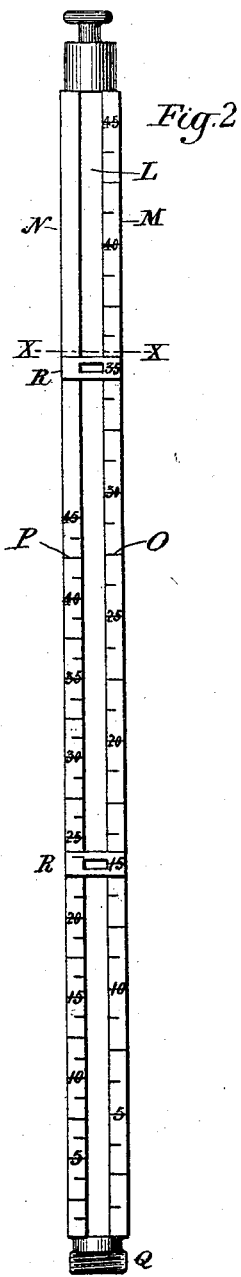
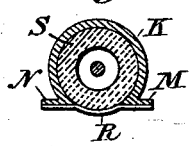
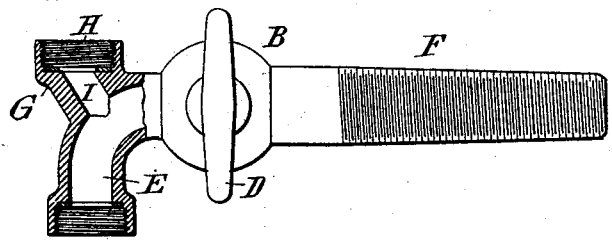
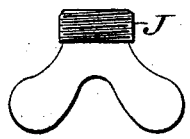
Witnesses:
Morris Black
John M. Larimer
Inventor:
Geo. J. Habermann
by Toulmin & Matthews
Attys

UNITED STATES PATENT OFFICE.

GEORGE J. HABERMANN, OF CLEVELAND, OHIO, ASSIGNOR, BY DIRECT AND MESNE ASSIGNMENTS, OF THREE-FIFTHS TO ARTHUR E. NESPER AND ALBERT B. CONKEY, OF SAME PLACE.

MEASURING DEVICE FOR LIQUIDS.

SPECIFICATION forming part of Letters Patent No. 599,704, dated March 1, 1898.

Application filed December 26, 1896. Serial No. 617,033. (No model.)

*To all whom it may concern:*

Be it known that I, GEORGE J. HABERMANN, a citizen of the United States, residing at Cleveland, in the county of Cuyahoga and State of Ohio, have invented certain new and useful Improvements in Measuring Devices for Liquids, of which the following is a specification, reference being had therein to the accompanying drawings.

The object of this invention is to produce a measuring device that will accurately determine the volume of liquid in a receptacle such as a keg or barrel and which will be particularly adapted for use where the receptacles are stored away and access to the same not easily had.

A further object of my invention is to ascertain the character of the fluid in the receptacle simultaneous with the determination of the quantity.

With these objects in view my invention consists, broadly, in a transparent casing communicating at one end with a receptacle containing a fluid, said casing being adapted to receive a column of the fluid, whereby the volume within the receptacle is determined, and means for retaining said fluid in the casing.

The invention further consists in the peculiar construction and combination of the various parts, all as more fully hereinafter described, and shown in the accompanying drawings, in which—

Figure 1 illustrates my invention as applied to a barrel containing liquid. Fig. 2 is a front elevation of the indicating device. Fig. 3 is a cross-section taken on line *x x*, Fig. 2; and Fig. 4 represents a vertical central section through the indicating device and its connection-pipe, showing the parts detached and arranged in proper relation with each other.

In Fig. 1 the letter A designates an ordinary barrel provided near the bottom with the usual discharge-orifice, in which is driven or screwed a faucet B, which faucet is adapted to communicate with a volume-indicating device C. Any connection-pipe between the indicating device and the receptacle may be employed to obtain the results desired. I preferably use, however, a faucet provided with the usual spigot D, discharge-spout E, and threaded extension-piece F. Upon the discharge-spout is cast a lug G, recessed at H and provided with a passage I therein. The free end of the discharge-spout and the recessed portion of the lug G are internally screw-threaded to permit of the insertion of the threaded plug J.

The indicator, which is adapted to communicate with the faucet, comprises a rigid inclosing casing K, preferably of a length corresponding to the height of the receptacle with which it is to be used. This casing is provided with a longitudinal slot L, Fig. 2, and upon either side of said slot are arranged rectangular face-plates M and N, carrying thereon the scales O and P, respectively. The casing is externally threaded at its lower end, as at Q, which threaded portion is adapted to engage with the thread in the recess H. To strengthen the casing just described metallic straps or bands R may be secured to the face-plates, as shown. Within this outer casing is arranged a transparent casing S, preferably in the form of a glass tube, and at the bottom of this tube is arranged a neck-piece U. This neck-piece is adapted to be driven into the lower end of the inclosing casing and fit snugly therein, while the tubular casing S is secured to the neck-piece by means of cement, as shown at T, Fig. 4. A valve-seat V is formed upon the lower end of the neck-piece, against which a valve W, carried by the stem X, is adapted to bear. The stem extends through the glass tube and through the portion of the inclosing casing extending beyond said tube and carries at its free end a button or thumb-piece Y. A spring Z is interposed between the bottom of the thumb-piece and a washer *a'*, which is adapted to rest upon the glass tube, all as plainly shown in Fig. 4.

In assembling the parts the faucet B is driven or screwed into the discharge-orifice in the receptacle and the plug J is inserted in the discharge-spout E of said faucet. The indicator C is then screwed into the threaded recess H. The operator by turning the spigot D and forcing the valve W away from its seat admits the fluid from the receptacle into the transparent casing S, said fluid rising therein until it reaches the level of the fluid in the receptacle. If the contents of a keg or barrel are to be ascertained and the barrel is in the position as shown in Fig. 1, the scale O upon the face-plate of the indicator will show the volume of the fluid within the receptacle in gallons or parts of gallons, as desired. If the barrel is resting upon its side and the discharge-opening is in the end, the parts are assembled in the same manner and a correct reading is obtained of the barrel contents on the scale P. After the proper reading is secured the operator releases the thumb-piece or button Y and the spring Z will draw the valve to its seat, thereby retaining the fluid in the indicator. By this operation the person measuring the contents of the receptacle is enabled to withdraw the indicator from the faucet and transport the said indicator to any desired locality, retaining at all times the proper reading, which denotes the volume of the fluid measured, and is further enabled to determine in the same operation the character of the fluid. Also by this construction of a measuring device but little fluid is lost, as the liquid within the transparent casing may be returned to the barrel. After the indicator has been withdrawn from the faucet the plug J is removed from the discharge-spout E and inserted in the recess H, thereby allowing the liquid in the barrel to be drawn off, when desired, in the usual manner.

It will be readily seen that an inclosing casing such as the one described is not essential in the construction of my device, as only the washer $a'$ may be placed over the top of the glass tube, upon which the spiral spring may be brought to bear, and an end piece carrying a valve-seat may be attached to the lower part of the tube, which will allow the transparent casing to be screwed into the recess H.

It is to be further noticed that in the construction of my improved device I have so arranged and constructed the indicator and the faucet or discharge-cock upon which it is arranged and with which it is adapted to communicate that said indicator may be readily detached therefrom and inserted in similar discharge-cocks in other casks or receptacles. It is therefore possible to employ a single indicator to determine the volume of liquid contents in a large number of casks. Moreover, the volume of the contents can be readily ascertained when the casks are stored away and piled one upon another where access to the same is not easily had.

I am aware that measuring devices are now manufactured by the use of which the amount of fluid in the cask can be ascertained by inserting the device within the cask. Such devices as these, however, are of no practical use when a large number of casks are piled one upon another in tiers. It is in such cases that my device is particularly adapted for use.

Having thus described my invention, what I claim, and desire to secure by Letters Patent, is—

In a measuring device for liquids, the combination with a cask containing a fluid, a transparent tube communicating with the cask at a point near its base and adapted to receive a column of liquid therefrom, means for retaining the liquid in said tube after the column has reached its highest point, a slotted metallic casing K inclosing the tube, straps R adapted to clamp the parts together, rectangular face-plates M and N integral with the casing, and a permanent scale upon each plate; one of said scales being so graduated as to indicate the total volume of liquid in the cask when the latter is arranged upon its side, and the other graduated in such manner that the total contents of the cask will be accurately indicated when the latter is upon end, substantially as shown and described.

In testimony whereof I affix my signature in presence of two witnesses.

GEORGE J. HABERMANN.

Witnesses:
ARTHUR E. NESPER,
L. J. WHITTEMORE.